United States Patent
Hoehne et al.

(10) Patent No.: US 6,933,047 B2
(45) Date of Patent: Aug. 23, 2005

(54) WAX-MODIFIED COATING COMPOSITIONS WITH IMPROVED ABRASION RESISTANCE

(75) Inventors: Joerg Hoehne, Hanau (DE); Paul-Ludwig Waterkap, Recklinghausen (DE); Wolfgang Crhistoph, Marl (DE)

(73) Assignee: Degussa AG, Duesseldorf (DE)

( * ) Notice: Subject to any disclaimer, the term of this patent is extended or adjusted under 35 U.S.C. 154(b) by 123 days.

(21) Appl. No.: 10/634,831

(22) Filed: Aug. 6, 2003

(65) Prior Publication Data

US 2004/0096665 A1 May 20, 2004

(30) Foreign Application Priority Data

Aug. 6, 2002 (DE) .......................................... 102 35 933
Jan. 7, 2003 (DE) .......................................... 103 00 118

(51) Int. Cl.[7] ................................................ B32B 5/16
(52) U.S. Cl. ........................ 428/402; 428/403; 428/407; 428/474.4; 525/56; 528/170
(58) Field of Search ................................. 428/402, 403, 428/407, 474.4; 525/56; 528/170

(56) References Cited

U.S. PATENT DOCUMENTS

| | | | | |
|---|---|---|---|---|
| 4,253,848 A | * | 3/1981 | Porter | 436/20 |
| 4,689,361 A | * | 8/1987 | Mumcu et al. | 524/196 |
| 5,830,975 A | * | 11/1998 | Perraud et al. | 528/170 |
| 6,027,814 A | * | 2/2000 | Julien et al. | 428/425.8 |
| 6,395,301 B1 | * | 5/2002 | Cantin | 424/489 |

* cited by examiner

*Primary Examiner*—leszek B Kiliman
(74) *Attorney, Agent, or Firm*—Oblon, Spivak, McClelland, Maier & Neustadt, P.C.

(57) ABSTRACT

A curable coating composition which is based on a hydroxyl-functional binder and a blocked polyisocyanate, comprising a suspended finely divided, wax-coated polyamide. This composition exhibits a number of superior properties including having a greatly improved abrasion value.

29 Claims, No Drawings

WAX-MODIFIED COATING COMPOSITIONS WITH IMPROVED ABRASION RESISTANCE

CROSS-REFERENCE TO RELATED APPLICATIONS

This application claims priority to German Application Nos. 102 35 933.4, filed Aug. 6, 2002, and 103 00 118.2, filed Jan. 7, 2003, the contents of which are hereby incorporated by reference in their entirety.

BACKGROUND OF THE INVENTION

1. Field of the Invention

Curable coating compositions based on polyamide powders.

2. Description of Related Art

Curable coating compositions based on a hydroxyl-functional binder and a polyisocyanate or a polyester-melamine resin system which comprise a suspended finely divided polyamide are known (EP B 0 047 58). These coating compositions cure to give a weather-stable and light-stable coating possessing good mechanical deformability, good abrasion resistance, and good chemical resistance.

At the present time fine polyamide powders principally based on polyamide 11 and polyamide 12 are used in polyurethane- and polyester-based coating materials as texturing agents and property enhancers. Other binder systems as well are conceivable.

These systems find application primarily in the coil coating industry, but also in the segment of wood coatings and, increasingly, in general industrial sectors. Examples include floor coverings or abrasion-resistant wood coatings for kitchen furniture (worktops).

In the present-day applications use is made of the very good abrasion resistance of the polyamide powders, particularly as texturing agents, in order to extend the life of the coating systems, in the area of sun protection systems (roller shutter bars), for example. In the coil coating process the coating systems are applied to sheets of aluminium and of steel which are subsequently cut and shaped to give the desired components.

The coating compositions developed to date are, for example, reactive systems which are reacted, and cure, in baking ovens, an example being the deblocking of isocyanates at temperatures above 160° C. and subsequent reaction with terminal hydroxyl groups of a polyester.

The basis for improving the polyurethane and/or polyester coating system with polyamide 11 powders and/or polyamide 12 powders as texturing agents is the reaction of the free reactive terminal groups which are demonstrably present in the polyamide, primarily terminal carboxyl groups and terminal amino groups, with the reactive components generated in the oven. This is accompanied by chemical incorporation of the polyamide into the coating film which forms within the oven.

A further suitable component for influencing the surface qualities and abrasion resistance of coating films are waxes, particularly micronized PE waxes. From a performance standpoint, however, high concentrations of waxes have adverse effects in the coating film. The coatings frequently exhibit a high sensitivity to fingerprints. Exudation phenomena may occur at the surface, which can reduce the brightness of the coating or even lead to a milky clouding of the coating. It has also been observed that high proportions of PE wax are dispersed incompletely in the coating material. As a result of the inhomogeneous distribution, the finished coating film has a spotted texture.

The object was therefore to provide a coating composition which does not have the described disadvantages even in the case of high wax fractions. This object has been achieved as described below.

BRIEF SUMMARY OF THE INVENTION

Surprisingly it has been found that with the above-described coating compositions which comprise polyamide powders a considerable improvement in the abrasion resistance of the coating film is achieved particularly when, in accordance with the invention, the polyamide powder has been coated beforehand with a wax.

DETAILED DESCRIPTION OF THE INVENTION

In this context it has surprisingly been observed that the abrasion resistance of the coating films is greatest if a wax-coated polyamide powder is used and is greater than if wax and polyamide powder are added conventionally, separately, to the coating composition.

It is moreover possible with the coating systems of the invention to avoid, or greatly reduce, the abovementioned disadvantages associated with high wax concentrations, such as fingerprint sensitivity, exudation at the surface and/or milky clouding.

The assumption that a chemical attachment of the polyamide powder in the coating film would be considerably hindered by a coating with wax and would allow the polyamide particles to be rubbed out of the coating film was wrong. Instead, surprisingly, it was found that in spite of the coating there is comparatively good chemical attachment of the terminal polyamide groups to the blocked reactive systems in the baking oven.

Suitable waxes in the coating composition of the invention include all olefinic and/or Fischer-Tropsch waxes. These waxes can also be used in modified form. An example of a modified wax is a PTFE-containing PE wax. These waxes advantageously have melting points of from 90° C. to 160° C.

The following remarks are intended to illustrate the product of the invention and its preparation.

The coating compositions of the invention comprise coated polyamide powders. These are composed of polyamide powders which preferably comprise polyamide 11 and/or polyamide 12. Polyamide powders which can be used include ground powders, produced by grinding polyamide granules, and precipitated powders. Particular preference is given to using polyamide 12 powders prepared by the precipitation process of DE 29 06 647 B1 (Hüls AG), since these powders have a very homogeneous particle morphology and a porous surface.

The average particle morphology $d_{50}$ in the case of the polyamide powders used in the coatings sector is preferably between 5 and 60 $\mu$m, although for certain applications larger particles up to $d_{50}$ about 150 $\mu$m are also used. All intermediate values and subranges are contemplated, including 5, 10, 15, 20, 25, 30, 40, 45, 50, 55 and 60 $\mu$m.

The polyamide powders are coated with a wax. In this case, generally, between 0.5 part and 10 parts of a micronized wax are applied per 100 parts of polyamide powder. All intermediate values and subranges are contemplated, for instance, 0.5, 1.0, 1.5, 2, 2.5, 3, 4, 5, 5.5, 6, 7, 8, 9 and 10 parts of micronized wax may be applied per 100 parts of polyamide powder.

The wax can be applied to the polyamide either as a cold mix in a dry blend or else by bonding or any other known hot mixing method, while ensuring that the maximum temperature in the mixer remains below the melting temperature of the polyamide powder, so that the polyamide powder does not undergo sintering or stick together to form larger particles and so that the mixer does not become coated with melted polyamide.

In the coating composition of the invention the coated polyamide powder is used in fractions between 0.1 and 40% by weight, the fraction being preferably between 0.5 and 5% by weight, more preferably between 1 and 3% by weight. All intermediate values an 2%, 2.5%, 3% 3.5%, 4%, 6%, 8%, 10%, 15%, 25%, 30%, 35% and 39%, a contemplated.

Such coating compositions further comprise components as described in EP 0 047 508 A2. The coating systems are based on a hydroxyl-functional binder which reacts with isocyanate groups of a polyisocyanate. Examples thereof are polyesters, polyols, polyethers, polyurethanes, polyglycols, polyacrylates, melamine resins, vinyl resins, epoxy resins, phenolic resins, urea resins or comparable polymers containing hydroxyl groups, and also other functional groups containing active hydrogen atoms, such as, for example, amines, polyamino amides, etc.

The coating compositions of the invention contain a total of blocked polyisocyanate and hydroxyl-containing binder, for example, of from 10 to 60% by weight, preferably from 20 to 40% by weight, it being possible, as described in EP 0 047 508, to vary the ratio between these two components between 0.5:1 and 5:1. All intermediate values and subranges are intended to be encompasses by the above range, for instance, the binder may be present at 10%, 15%, 20%, 30%, 35%, 40, 42.5%, 50%, 55% and 60% by weight. All intermediate ratios of these components, such as 0.75:1, 1:1, 2:1, 2.5:1, 3:1, 3.5:1, 4:1 and 5:1, are also contemplated.

The coating compositions may further comprise various solvents, and also dyes, pigments, and further commercially customary additives such as, for example, UV stabilizers. Corresponding compounds are likewise described in EP 0 047 508.

The coating compositions of the invention can be applied to the respective surface by any customary method. As nonlimiting examples mention may be made of spray coating methods, roller coating methods, strip coating methods (coil coating), flow coating and knife coating methods. Examples of conventional methods are also incorporated by reference to the *Kirk-Othmer Encyclopedia of Chemical Technology*, 4$^{th}$ edition (1993), see especially, vol. 6, pages 606–746.

The surface provided with the coating composition is subsequently heated to a temperature at which the reactive systems are able to react with the functional groups of the binder and of the polyamide powder. In the course of this heating, the coating composition flows out to form a coating film, and cures. Heating can take place either in an oven (forced-air oven) or by irradiation with a heat source or else by induction.

The examples which follow are intended to illustrate the invention, without restricting it to them:
Preparation of the Coated Exemplary Polyamides 100 parts of a polyamide 12 precipitated powder prepared in accordance with DE 29 06 647 B1 and having an average particle distribution $d_{10}$=7 μm, $d_{50}$=21 μm and $d_{90}$=38 μm are mixed intensively with various waxes according to table 1 in each case for 3 minutes on a 101 Henschel high-speed mixer at 600 rpm. The power consumption of the mixer is in each case about $3.4*10^4$ W.

TABLE 1

Polyamide powders for clearcoat materials

| Product | Wax type | Wax fraction |
|---|---|---|
| Polyamide A | VESTOWAX 1012 | 5 parts |
| Polyamide B | Lanco-Wax TF1778 | 5 parts |
| Polyamide C | Comomulus VP 45 | 5 parts |
| Polyamide D | Lanco PE1500 SF | 5 parts |
| Polyamide E | — | 0 parts |

In addition, the polyamide 12 precipitated powder was used without wax, as a comparative example, labelled Polyamide E. The polyamide powders were used to produce a clearcoat material as per table 2:

TABLE 2

Composition of clearcoat material

| | |
|---|---|
| Polyester resin, oil-free | 45% |
| Polyisocyanate, blocked | 15% |
| Polyacrylate | 1% |
| DBTL (catalyst) | 0.2% |
| Polyamide 12 powder (Polyamide A–E) | 0–10% |
| Solvent mixture (aromatic hydrocarbons) | ad 100% |

Some coating materials additionally contain 1% of micronized wax (see table 3).

The coating materials were used to produce sample coatings with a dry film thickness of 20 μm on an aluminium sheet. The abrasion resistance was determined in accordance with DIN ISO 53754 using a Taberabraser 2×50 g CS 10 rolls 3000 revolutions. The abrasion values are compiled in table 3a and 3b.

TABLE 3a

| Example | Polyamide powder | Micronized wax | Abrasion [mg] |
|---|---|---|---|
| 1. (Blank sample) | — | — | 90 |
| 2. (Comparative) | 10% Polyamide E | — | 72 |
| 3. | 10% Polyamide A | — | 58 |
| 4. | 10% Polyamide B | — | 62 |
| 5. | 10% Polyamide C | — | 62 |
| 6. | 10% Polyamide D | — | 57 |

TABLE 3b

| Example | Polyamide powder | Micronized wax | Abrasion [mg] |
|---|---|---|---|
| 7. (Blank sample) | — | 1.5% VESTOWAX 1012 | 52 |
| 8. (Comparative) | 10% Polyamide E | 1.5% VESTOWAX 1012 | 53 |
| 9. | 10% Polyamide A | 1% VESTOWAX 1012 | 30 |

The coatings of the present invention may be applied to materials where durability or chemical or corrosion resistance is desired. For instance, they may be used to coat metal or wood surfaces which are subject to abrasion or corrosion.

The durability of flooring materials, such as wood flooring, may be improved by application of the coatings of the invention. Furniture, office supplies, hospital and kitchen equipment may also be coated for improved durability. Dishwasher baskets, hot water heaters, food trays, chemical etching or plating equipment, chair bases, knobs, handles and other hardware may be coated as well as plumbing equipment or supplies, such as water pipes.

Modifications and Other Embodiments

Various modifications and variations of the described ingredients, compositions and methods as well as the concept of the invention will be apparent to those skilled in the art without departing from the scope and spirit of the invention. Although the invention has been described in connection with specific preferred embodiments, it should be understood that the invention as claimed is not intended to be limited to such specific embodiments. Various modifications of the described modes for carrying out the invention which are obvious to those skilled in chemistry, chemical engineering, polymer or material sciences, or related fields are intended to be within the scope of the following claims.

Incorporation by Reference

Each document, patent application or patent publication cited by or referred to in this disclosure is incorporated by reference in its entirety. Any patent document to which this application claims priority is also incorporated by reference in its entirety. Specifically, German priority documents 102 35 933.4, filed Aug. 6, 2002 and 103 00 118.2, filed Jan. 7, 2003 are hereby incorporated by reference.

What is claimed is:

1. A composition comprising a wax-coated polyamide powder, wherein said polyamide powder is a suspended finely divided polyamide based on a hydroxyl-functional binder and a polyisocyanate.

2. The composition of claim 1, comprising from 0.1 to 40% by weight of the coated polyamide powder.

3. The composition of claim 1, comprising from 0.5 to 5% by weight of the coated polyamide powder.

4. The composition of claim 1, comprising from 1 to 3% by weight of the coated polyamide powder.

5. The composition of claim 1, wherein the wax is one or more olefinic or Fischer-Tropsch wax(es).

6. The composition of claim 1, wherein said one or more wax(es) has a melting range of from 90 to 160° C.

7. The composition of claim 1, wherein the polyamide powder comprises polyamide 11 or polyamide 12, or both.

8. The composition of claim 1, wherein the polyamide powder comprises a polyamide 12 precipitated powder.

9. The composition of claim 1, wherein the polyamide powder has an average particle morphology ranging from 5 to 60 μm.

10. The composition of claim 2, which comprises between 0.5 and 10 parts of a micronized wax per 100 parts of polyamide powder.

11. The composition of claim 1, further comprising one or more solvent(s), dye(s), pigment(s) or UV stablizer(s).

12. The composition of claim 1 in uncured form.

13. An uncured or cured coating produced from the composition of claim 1.

14. A material or product comprising the coating of claim 13.

15. A cured coating produced from the composition of claim 1.

16. A metal that is coated with the composition of claim 1.

17. A wood that is coated with the composition of claim 1.

18. A flooring material coated with the composition of claim 1.

19. Furniture or office equipment that is coated with the composition of claim 1.

20. An appliance, kitchen equipment, hardware, laboratory or commercial or industrial equipment or supply, or plumbing equipment or supply that is coated with the composition of claim 1.

21. A method for coating a material comprising:
applying the composition of claim 1 to said material under conditions suitable for the formation of a coating.

22. The method of claim 21, wherein said composition is applied by a spray coating method, roller coating method, strip coating method (coil coating), flow coating method or knife coating method.

23. The method of claim 21, wherein the conditions suitable for formation of a coating comprise heating the material to which said composition has been applied.

24. The method of claim 21, wherein said material is a metal.

25. The method of claim 21, wherein said material is an aluminium coil or iron coil.

26. The method of claim 21, wherein said material is a wood.

27. The method of claim 21, wherein said material is a flooring material.

28. A process for preparing a curable coating composition comprising a wax-coated polyamide powder, wherein said polyamide powder is a suspended, finely-divided polyamide based on a hydroxyl-functional binder and a blocked polyisocyanate, comprising:
coating a polyamide powder with a wax before adding it to a curable coating composition.

29. A polyamide powder based on a hydroxyl-functional binder and a blocked polyisocyanate that is coated with a wax.

* * * * *